United States Patent [19]
Schattenberg

[11] 3,990,674
[45] Nov. 9, 1976

[54] PLASTIC SPRING

[75] Inventor: Harold F. Schattenberg, Lansing, Mich.

[73] Assignee: General Motors Corporation, Detroit, Mich.

[22] Filed: Oct. 8, 1975

[21] Appl. No.: 620,640

[52] U.S. Cl. ................................. 251/75; 74/520; 98/41 R
[51] Int. Cl.² ........................................ F16K 31/56
[58] Field of Search .................... 251/75; 137/418; 74/520; 98/41 R

[56] References Cited
UNITED STATES PATENTS

| | | | |
|---|---|---|---|
| 1,161,554 | 11/1915 | Voigt | 137/418 |
| 3,037,484 | 6/1962 | Dixon | 251/75 X |
| 3,327,946 | 6/1967 | Benson | 251/75 |

*Primary Examiner*—Alan Cohan
*Attorney, Agent, or Firm*—K. H. MacLean, Jr.

[57] ABSTRACT

For use with an air outlet assembly having a damper valve therein with a crank arm extending from the side of the outlet, a combination lever and positioning spring adapted to engage the crank arm and pivot between first and second operative positions corresponding to open and closed positions of the damper. One end portion of the combination lever and spring which engages the crank arm has a bifurcated configuration with integrally jointed strip portions extending on either side of the crank arm. The lever is pivotally supported at a mid-portion and has a second end adapted for manual actuation. The bifurcated end portion forms an opening between the integrally joined strips through which the crank arm extends. As the crank arm is pivoted between the first and second operative positions, it moves axially with respect to the lever and causes separation of the strip portions accompanied by relative flexing of the joining portion between the strips thereby producing a force on the crank arm tending to move it from an intermediate position into first or second operative positions.

2 Claims, 4 Drawing Figures

PLASTIC SPRING

This invention relates generally to air outlets of the type having an on-off damper control therein actuated by a crank arm and specifically to a combination positioning lever and spring for operating the crank arm and moving it and the associated damper between on and off positions.

The present invention is applicable to automobile ventilation systems of the type having an air flow control adapted to either block air flow through the outlet or provide a maximum air flow therethrough. In such an arrangement, it is desirable that a positioning actuator be used which permits the operator to identify the two positions in a positive manner (by feel) without visually observing the actuator.

It is common, in association with dampers, to provide a crank arm connected to the damper shaft for rotating the damper. Also known is to use an off-center toggle type actuator in which the crank arm passes from a first operative position to a second operative position through the plane extending between the axis of the damper and the axis of the actuator mount.

Prior devices of this type have utilized actuator assemblies including a multitude of separate parts which are assembled together. The subject invention utilizes a one-piece combination positioning lever and spring pivotal about a midpoint to engage and move the crank arm and connected damper between first and second operative positions in a positive snap action manner.

Therefore, it is an object of the present invention to provide a simple and economical positioning actuator for a damper and crank arm including a one-piece plastic member pivotally mounted at its mid-point with means on one end to engage the crank arm and shift it between operative position in positive, snap-action manner.

A further object of the present invention is to provide an economical yet efficient plastic lever and spring combination adapted to engage the crank arm of a damper and move the damper between first and second operative positions by the flexing of an integral joint between bifurcated portions of the lever and spring.

Further objects and advantages of the present invention will be more readily apparent from the following detailed description of a preferred embodiment, reference being had to the accompanying drawings in which the embodiment is illustrated.

IN THE DRAWINGS

Figure 1:
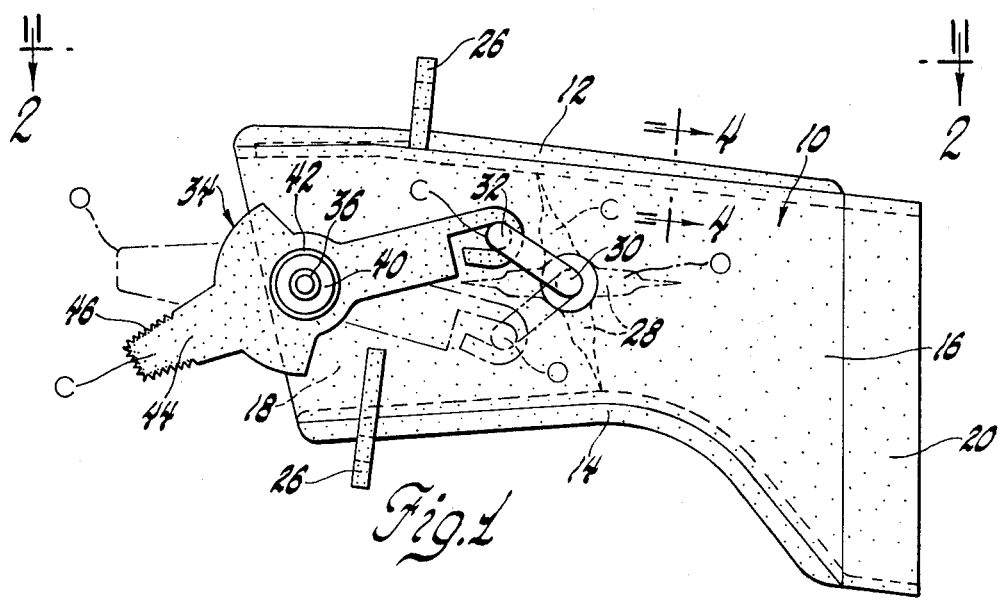
FIG. 1 is an elevational side view of an air damper as may be utilized in an automobile ventilation system on which is mounted the subject lever and plastic spring actuator.
Figure 2:
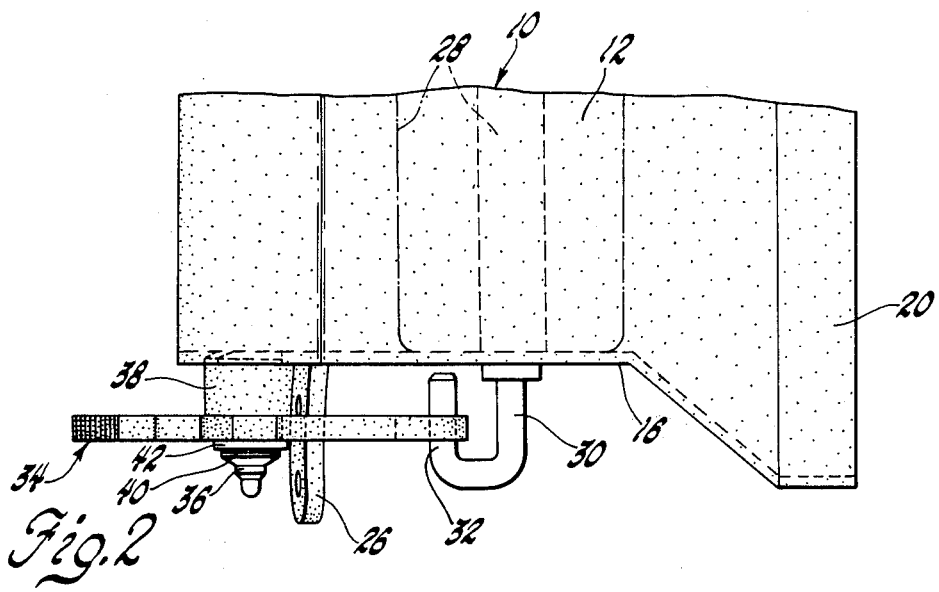
FIG. 2 is a planar view of the air outlet and the actuator of FIG. 1 looking in the direction of arrow 2—2 in FIG. 1.
Figure 3:
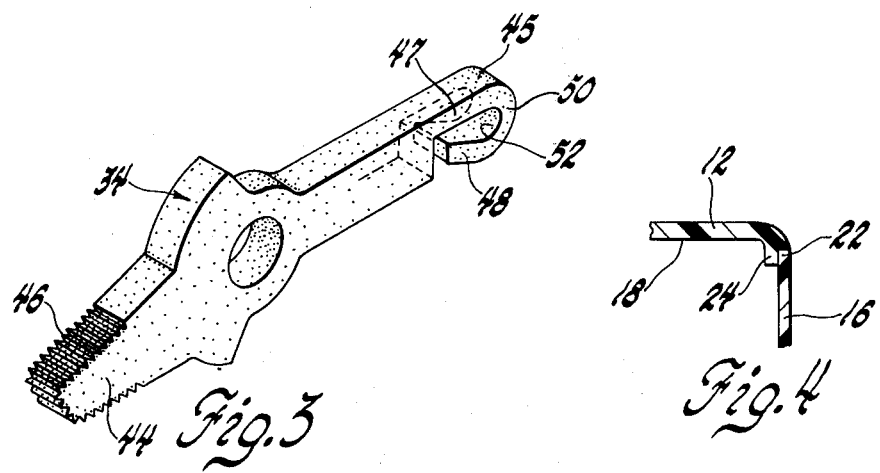
Figure 4:
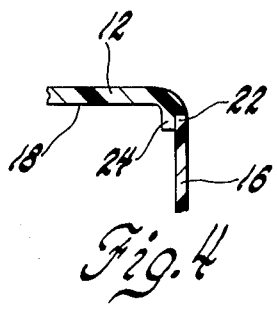

FIG. 3 is a perspective view of the one-piece combination positioning lever and spring; and FIG. 4 is a detailed sectioned view of the air outlet housing shown in FIG. 1 along Section line 4—4 and looking in the direction of the arrows. In FIGS. 1 and 2, an air outlet assembly 10 is illustrated and includes a generally rectangular box-like structure with a top wall 12, a bottom wall 14 and side walls 16 (only one of the side walls is visible in FIGS. 1, 2). Both ends of the outlet assembly are open and an air flow passage 18 extends therethrough. The inlet end 20 of the outlet assembly 10 is adapted to be connected to an air supply or other source of ventilating air for the vehicle interior. The end of assembly 10, to the left in FIGS. 1 and 2, is open to the passenger compartment for delivery of ventilating air. The flow passage 18 is thus formed by the wall members 12, 14 and 16 which intersect and are joined at their edges in the manner shown in FIG. 4 (and bonded by heat sealing or using a plastic sealant). Specifically, the edge 22 of one wall fits within a recess or channel formed in edge portion 24 of the adjacent wall. The outlet assembly 10 is adapted to be supported within an opening in the dashboard of an automobile by flange portions 26 through which fasteners (not shown) extend.

A damper valve assembly 28 within passage 18 is shown in FIGS. 1 and 2. The damper valve is preferably of a molded rubber or plastic material and is supported about a shaft 30, both ends of which extend into and are supported by the side walls 16. The end of shaft 30, as shown in FIG. 2, extends through the side wall 16 and is integrally formed into a crank arm 32 with a portion offset but parallel to the axis of shaft 30. In the illustrated embodiment, the crank arm 32 is formed with a 180° bend in the shaft 30. This prevents the end of the crank arm from getting hung up or caught on instrument panel structure when the outlet 10 is inserted. The alternate operative position C, O of the damper 28 and the crank arm 32 are shown in FIG. 1. The crank arm 32 is intended to be positioned either in the C position or the O position and not permanently in an intermediate position.

The crank arm 32 is moved between position C and 0 by a one-piece combination lever and spring actuator 34. The actuator 34 is pivotally supported upon a shaft 36 which extends from the enlarged diameter portion 38 on side 16. The boss 38 spaces the lever 34 a predetermined distance from the side wall 16. A spring washer type retainer 40 inserted over the end of shaft 36 holds a washer 42 and the lever 34 against boss 38 so as to permit pivotal movement of the lever 34 thereabout. As best shown in FIG. 3, the lever 34 has an end portion 44 with a serrated edge portion 46 adapted to extend into the passenger compartment of a vehicle so that an operator may manually actuate portion 44 in an up and down direction so as to open and close the connected damper 28.

The lever 34 has a second end portion 45 which is adapted to engage crank arm 32. Specifically, the end 45 is formed with integrally connected bifurcated end strips or portions 47 and 48 which are joined by loop portion 50. An opening 52 which is formed adjacent the connecting portion 50 is of sufficient diameter to freely receive the crank 32. As the lever 34 is pivoted from position C to position O, the crank arm 32 moves in an axial direction with respect to the lever 34 and forces the bifurcated strip portions 47 and 48 to separate from one another, thus flexing the integral connecting portion 50. During pivoting of crank arm 32 from closed to open operative positions, the arm 32 passes through a plane which extends through the axes of shafts 30 and 36. After passing through the aforedescribed plane or mid-point, further movement of the crank arm 32 from the mid-position is aided by the force exerted on portion 48 by the distorted connecting portion 50. Thus, the motion of the crank arm into the open or closed operative positions occurs in a positive snap-action manner. This assistance of the spring portion 45 in locating the crank arm 32 in either a closed or an open position greatly assists the vehicle operator in achieving desired actuation of the valve assembly without visual observation.

Although the embodiment illustrated in the drawings is a preferred embodiment, other embodiments may be adapted without falling outside the scope of the following claims.

What is claimed is:

1. An integral positioning lever and centering spring for pivoting the crank arm of a flow control member such as a damper located in a fluid passage of a housing comprising: an elongated body with means located at a mid-portion to permit mounting the lever for pivotal movement; one end of the body extending a sufficient distance from the mounting means to permit manual actuation of the body between open and closed operative positions; a second end portion of said body engaging the crank arm to produce movement of said crank arm between open and closed operative positions corresponding to open and closed damper positions during which movement the second end portion and the crank arm passes through a plane defined by the damper axis and the location about which said body pivots; means formed in the second end portion to accommodate movement of the crank arm in an axial direction with respect to the elongated body; said means including strip portions extending on either side of said crank arm which are integrally joined by a connecting portion to form an opening through which said crank arm extends; said strip portions being spaced closer together in the axial direction from said opening to cause the crank arm to initially spread the strip portions further apart as the crank arm is moved from one operative position to an intermediate position marked by passage of the crank arm through said plane and to subsequently permit the strip portions to return to a relatively unstressed condition as the crank arm is moved from said intermediate position to the other operative position whereby a resultant positioning force on the crank arm is produced to cause the damper to move in a positive manner into its operative positions.

2. An integral positioning lever and centering spring for pivoting the crank arm of a flow control member such as a damper located in a fluid passage of a housing with opposite walls comprising: an elongated body of plastic material with means located at a mid-portion to permit mounting of the lever for pivotal movement in a plane substantially parallel to one of said housing walls and normal to the axis of the damper; one end of the body extending sufficiently from the mounting means to permit manual actuation of the body between open and closed operative positions; a second end portion of said body engaging the crank arm to produce movement of said crank arm between open and closed operative positions corresponding to open and closed damper positions during which movement the second end portion and the crank arm passes through a plane defined by the damper axis and the location about which said body pivots; means formed in the second end portion to accommodate movement of the crank arm in an axial direction with respect to the elongated body; said means including relatively thin and resilient strip portions extending about the crank arm and integrally joined by a connecting portion to form an opening through which said crank arm extends; said opening being axially spaced from said intermediate mounting means of said body to permit centering of the crank arm therein when the damper is in its open and closed positions; said strip portions being spaced closer together in the axial direction from said opening to cause the crank arm to initially spread the strip portions apart as the crank arm moves from one operative position to an intermediate position marked by passage of the crank arm through said plane and to subsequently permit the strip and connecting portions to return to a relatively unstressed condition as the crank arm moves from said intermediate position to the other operative position whereby a resultant positioning force on the crank arm is produced to cause the damper to move in a positive manner into its operative position.

* * * * *